DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1232

T912,009

PROCESS OF PREPARING POLYURETHANE POLYUREA FOAMS HAVING INTEGRAL SKIN

Albert Pierre Strassel, 4 Avenue des Cedres, Domaine de la Ronce, 92 Ville d'Auray, France, and Dominique Jeandot, 1 Rue Renoir, Garges-les-Gonesse, France

Continuation of application Ser. No. 619,021, Feb. 27, 1967. This application Dec. 10, 1971, Ser. No. 206,859

Claims priority, application France, Mar. 2, 1966, 51,755

Int. Cl. C08g *22/46*

U.S. Cl. 264—45

No Drawing. 17 Pages Specification

A process for preparing a cellular polyurethane-polyurea composition having a resistant, strong molding skin that remains bonded to said cellular composition and exhibits no visible porosity to the naked eye, and a foam density greater than 150 grams per liter by (A) preparing a reaction mixture by mixing a polyisocyanate, a polyoxyalkylene polyol having an average molecular weight between about 130 and 6,000, an aromatic polyamine, a foaming agent, and a catalyst for the polyurethane-polyurea reaction the $NH_2/OH$ ratio being between 0.3 and 5/1, the $NCO/OH+NH_2$ ratio being between 0.9 and 2/1, the amount of foaming agent being from 0.5 to 50 weight percent of the weight of the reaction mixture, the amount of catalyst being from 0 to 2 weight percent of the combined weight of said polyol and said aromatic polyamine, the mixing being carried out at a temperature in the range of about 0° to 140° C.;

(B) introducing the reaction mixture into a mold, which is at a temperature between about 20° and 140° C., wherein the reaction and expansion take place;

(C) after completion of the expansion, placing the mold in an oven maintained at a temperature in the range of about 20° to 140° C.; and (D) after a period of from about 5 to 30 minutes removing the mold from said oven and demolding the resulting cellular composition.